United States Patent [19]

Grimaldi

[11] Patent Number: 4,772,175

[45] Date of Patent: Sep. 20, 1988

[54] SPACE STATION ERECTABLE MANIPULATOR PLACEMENT SYSTEM

[75] Inventor: Margaret E. Grimaldi, W. St. Paul, Minn.

[73] Assignee: The United States of America as represented by the Administrator of the National Aeronautics and Space Administration, Washington, D.C.

[21] Appl. No.: 929,865

[22] Filed: Nov. 13, 1986

[51] Int. Cl.$^4$ ............................................. B66C 23/00
[52] U.S. Cl. ................................. 414/689; 414/718; 414/735; 212/225; 212/257; 182/103
[58] Field of Search ............... 414/718, 729, 730, 735, 414/689; 212/225, 226, 257, 200, 242, 243, 244; 901/1, 14, 50; 182/102, 103; 104/248; 244/159, 161

[56] References Cited

U.S. PATENT DOCUMENTS

| | | | |
|---|---|---|---|
| 1,064,120 | 6/1913 | Bansmer | 414/689 |
| 1,064,121 | 6/1913 | Bansmer | 414/689 |
| 2,983,391 | 5/1961 | Insolio et al. | 212/129 |
| 3,184,084 | 5/1965 | Hellander | 414/689 |
| 3,262,593 | 7/1966 | Hainer | 414/619 |
| 3,437,223 | 4/1969 | Haase | 414/618 |
| 3,693,755 | 9/1972 | Terayama | 182/102 |
| 3,757,977 | 9/1973 | Brudi et al. | 414/607 |
| 3,888,360 | 6/1975 | Ando et al. | 414/662 |
| 3,921,758 | 11/1975 | Kozai | 182/103 X |
| 4,191,300 | 3/1980 | Beghi et al. | 212/242 |
| 4,334,816 | 6/1982 | Slysh | 244/159 X |
| 4,491,196 | 1/1985 | Böcker | 182/102 X |
| 4,527,934 | 7/1985 | Blaseck | 414/4 |
| 4,531,884 | 7/1985 | Russell | 414/729 |
| 4,547,119 | 10/1985 | Chance et al. | 414/718 X |
| 4,585,388 | 4/1986 | Gossain et al. | 414/735 |
| 4,637,494 | 1/1987 | Iida et al. | 901/1 X |
| 4,652,204 | 3/1987 | Arnett | 901/1 X |
| 4,669,390 | 6/1987 | Bisiach | 104/248 |

FOREIGN PATENT DOCUMENTS

| | | |
|---|---|---|
| 2029016 | 12/1970 | Fed. Rep. of Germany . |
| 0231932 | 1/1986 | German Democratic Rep. . |
| 2172574 | 9/1986 | United Kingdom ............... 414/689 |

OTHER PUBLICATIONS

Wagner-Bartak, "Future Applications of Remote Manipulators in Space", Canadian Aeronautics & Space Journal, vol. 27, No. 7, 1981.
Robert B. Aronson, "Let the Robot Do It", 11/1975.
Robert Malone, "Systems Making Mark in Robotics", 4/11/83.

Primary Examiner—Robert J. Spar
Assistant Examiner—Jennifer L. Doyle
Attorney, Agent, or Firm—Hardie R. Barr; John R. Manning; Edward K. Fein

[57] ABSTRACT

An erectable manipulator placement system for use on a space station and comprising an elongate lattice-like boom having dual guide tracks attached to parallel chords thereof, a carriage-like dolly movable along said tracks, and a segmented maneuvering arm-like assembly pivotally mounted on and extending from said dolly. The system further includes a turntable base pivotally interconnected with the proximal end of the boom and positioned either on a part of a transferring vehicle, or on another payload component being carried by said transferring vehicle, or on the space station.

11 Claims, 1 Drawing Sheet

SPACE STATION ERECTABLE MANIPULATOR PLACEMENT SYSTEM

ORIGIN OF THE INVENTION

The invention described herein was made by an employee of the United States Government and may be manufactured and ued by or for the Government of the United States of America for governmental purposes without payment of any royalties thereon or therefore.

BACKGROUND OF THE INVENTION

This invention relates to methods and apparatus for handling selected objects, and more particularly relates to improved methods and apparatus for manipulating objects in hostile or otherwise disadvantageous environments or conditions.

It is well known that it has been proposed to place a habitable "Space Station" in an orbital path around the earth, and to construct such station from parts or components which will be separately ferried up from the surface of the earth and thereafter assembled at a selected location along said orbital path. Upon consideration of the problems inherently attending such a task, it will be immediately apparent that a suitable manipulating system will be required for securing and thereafter maneuvering such components into a position whereby they may be suitably interconnected.

There are, of course, many different types of systems and techniques for manipulating and treating articles under conventional circumstances. For various reasons hereinafter reviewed in detail, none of these prior art systems and techniques are suitable for the above-identified purpose.

There are many situations when, for various different reasons, special methods or apparatus are either preferred or required in order to handle a particular object. For example, the object itself may be too heavy to be manipulated, it may be dangerous to approach and manually handle, or the object may be positioned in an inaccessible location or a hostile environment. Alternatively, the object may be located in an assembly line or the like, wherein a particular manipulation is sought to be performed by one or more steps in an automated process.

More particularly, it is well known that the prior art is replete with examples of different forms of apparatus for manipulating objects for differet purposes under different conditions. For example, Ando et al, (U.S. Pat. No. 3,888,360) details a programmable robot having a movable hose upon which a manipulator arm is attached. Movement of equipment through utilization of said configuration is limited, however, since base motion is restricted to rectilinear motion along three orthogonal axes.

Further, Haase (U.S. Pat. No. 3,437,223), Hainer (U.S. Pat. No. 3,262,593) and Insolio et al (U.S. Pat. No. 2,983,391), disclose a carrier block, a support structure, and a trolley element from which a manipulator arm extends. These carrier bases are confined to movement within only one plane.

It will be apparent that, in many if not all such examples, it is convenient, if not essential, that the operator of the manipulating device be situated in a location which is either remote from the initial position of the object is to be is remote from the position to which the object being handled, moved, or both. See, for example, Blaseck (U.S. Pat. No. 4,527,934) which is a remotely-controlled manipulator attached to a support means which moves vertically on a guide column. This guide column is mounted on upper and lower rotatable plates in order to achieve rotation of the guide column about the vertical axes of the plates. The rotation of the guide column, however, is restricted to that direction of rotation which is parallel to the rotational axes of the plates depicted in the reference. This creates a critical limitation on the operator's freedom of movement insofar as his ability to handle the manipulating device is concerned, and it requires that the operator be located in close proximity to the manipulating.

All of these techniques and devices are, of course, generally suitable for their intended purposes. It will be noted, however, that there is a common characteristic with respect to these and all other similar manipulating devices and techniques in the prior art; i.e., the manipulating techniques and devices in the prior art are all designed for use under conditions wherein the operator is situated in a relatively normal environment, and wherein it is only the object sought to be manipulated which is situated in an abnormal environment. In other words, all of the prior art devices anticipate that the operator will be capable of full freedom of movement insofar as his ability to handle the manipulating device is concerned.

The present invention is directed to an application which is completely different from those hereinbefore discussed with respect to prior art methods and apparatus. More particularly, there are plans to construct an orbiting "Space Station" from components and sub-assemblies which are separately ferried to the orbital location where they are to be be assembled. Accordingly, it will be apparent that such a project will require the means for maneuvering objects of various different shapes and sizes under the most adverse conditions. Both the operator as well as the object to be handled are situated in the same hostile environment and under conditions wherein the operator is severly limited in his freedom of action. Such a maneuvering device or means must be capable of seizing and moving these various components in almost any direction relative to the position of the operator, and over extended distances of travel. This maneuvering device itself must also be capable of being carried into orbit by transport means and techniques now available.

It has previously been proposed to employ a manipulating device for use on the Space Station known as a "Mobile Remote Manipulating System" (MRMS). This device is capable of seizing and moving an object in two orthogonal directions relative to its orbital location on the station. More particularly, the MRMS is movably secured to the nodes of a truss-like member of the station and a push-pull mechanism provides an "inch worm" translation of the MRMS along the truss. In addition, a self-contained power unit or supply is required for moving the device to various locations along the station.

Although the so-called MRMS device is clearly more suitable for its intended purpose than are any of the techniques and devices depicted in the aforementioned prior art, it will nevertheless be apparent that the MRMS is also subject to certain limitations. To begin with, it can be seen that the MRMS is only capable of moving an object along one of two orthogonal directions, relative to its orbital location, at a time. This increases, considerably, the amount of time required to transport a payload between the transport vehicle and the station, or between two points along the station. The reach capability of the MRMS is also limited to the extended length of the manipulator arm. This limitation makes it difficult to use the MRMS as a berthing aid.

Further, since the MRMS is designed to ride along the truss members of the space station, it is necessary to avoid obstructing the travel path of the device. This clearly limits the amount of useful payload attachment space available If any part of the structure on which the MRMS travels is damaged or obstructed, the directions in which the device can move will also be severely restricted.

These and other disadvantages of, or limitations on, the capabilities of the prior art are overcome or substantially mitigated with the present invention. Improved methods and apparatus are herewith provided for manipulating objects of varying size and shape under extraordinarily disadvantageous operating conditions.

SUMMARY OF THE INVENTION

In a preferred embodiment of the present invention, a manipulator system is provided which has been colloquially denoted as the "Space Station Erectable Placement System" (SSEMPS). SSEMPS includes a simple space framework boom having dual guide tracks attached to parallel chords thereof, or which are integrally formed therewith, so as to permit movement of a dolly up and down its tracks, and so as to achieve locking of the dolly in place at selected locations on the boom. A manipulator arm of conventional construction such as the Space Station Remote Manipulator System is attached to the dolly for the transfer and handling of work articles, and one end of the boom is attached to a turntable at four points, two adjacent (in line) points at the end of the guide tracks being attached to the turntable by linear actuators, and the two opposite points being attached by rotatable joints. The turntable permits a 360 degree rotation of the boom in either direction, while the linear actuator/rotatable joint attachments permit tilting of the boom at variable angles relative to the turntable axis of rotation.

In view of the foregoing, it is an object of the present invention to provide a remotely-controlled manipulator placement system which is both erectable and usable in outer space. The system was designed for use on a space station, or the like, and is capable of accessing large areas, maneuvering payloads, and avoiding objects which cause an obstruction when transferring payloads. SSEMPS also provides a manipulator placement system which may be utilized as a berthing aid for interconnecting one type of orbiting vehicle or structure to another.

It is a further object of the present invention to provide a manipulator placement system which complies with space and weight limitations required for the transfer of payloads between a ground-based location and a location in outer space.

These and other objects and features of the present invention will become apparent from the following detailed description, wherein reference is made to the structure depicted in the accompanying drawing.

BRIEF DESCRIPTION OF THE DRAWING

This drawing depicts a perspective view of an erectable manipulator placement system shown in the erected position and embodying the concepts of the present invention.

DETAILED DESCRIPTION OF THE INVENTION

Figure 1:
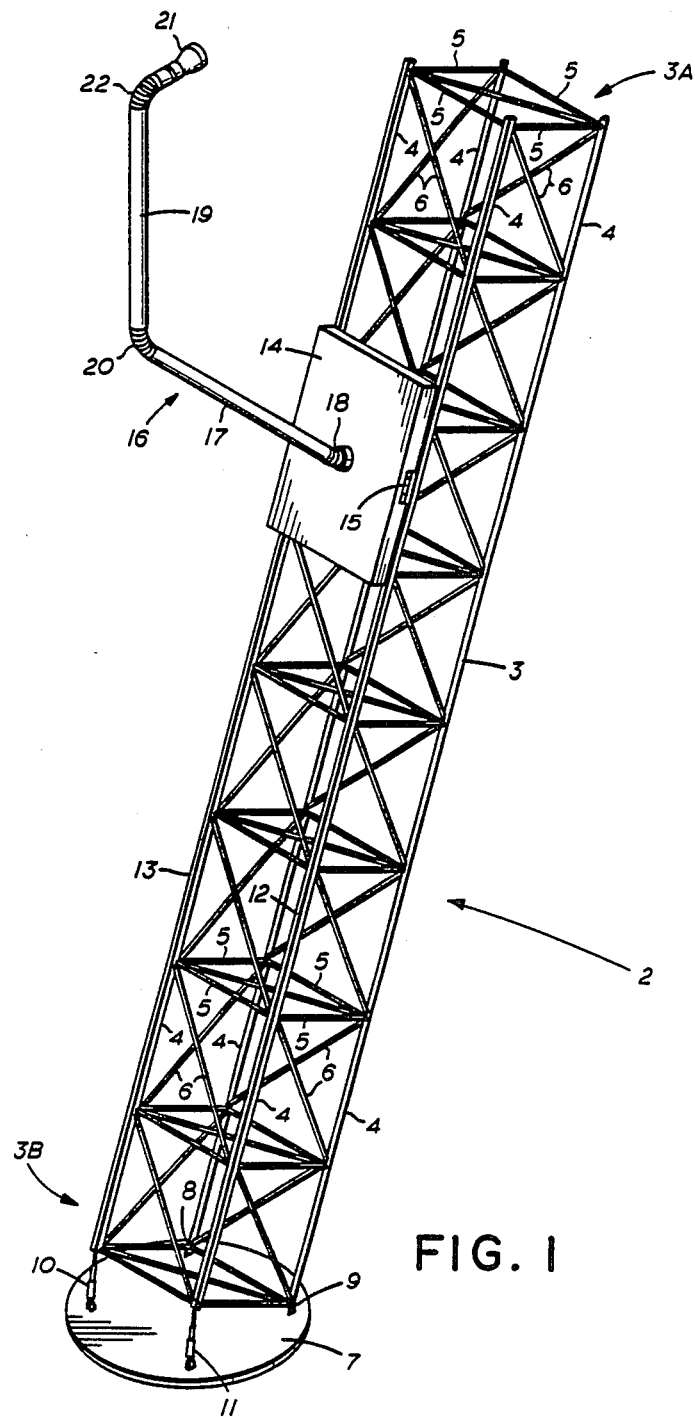

Referring now to the structures depicted in the accompanying drawing, there may be seen one form of the aforementioned SSEMPS assembly 2. It includes an open lattice-like boom 3, composed of four spaced-apart longerons 4 extending from the distal end 3A of the boom 3 to its proxial end 3B and a plurality of lateral struts 5, each perpendicularly interconnected between adjacent longerons 4 at spaced-apart locations along the entire length of the boom 3. A further plurality of bracing struts 6 are added, each interconnected between opposite longerons 4 at 45 degree angles with respect to the adjacent lateral struts 5 in order to provide stiffness to the boom 3.

Referring further to the structures depicted in the accompanying drawing, it may be seen that the boom 3 is preferably interconnected at its proximal end 3B to a turntable 7, or the like, by suitable hinges 8 and 9 and actuators 10 and 11 affixed to the ends of the four longerons 4. The turntable 7 is preferably rotatably mounted on a structure (not depicted) having a size and mass such that, when placed in a suitable orbital location, arcuate movement of the boom 3 relative to the turntable 7, or revolvement of the boom 3 due to rotation of the turntable 7, will not significantly affect the posture or position of the structure on which it is suppoted. The hinges 8 and 9 and the actuators 10 and 11 enable the boom 3 to be tilted at various angles with respect to the axis of rotation of the turntable base 7. The actuators 10 and 11 are hingedly interconnected with and between the turntable base 7 and the adjacent ends of a pair of longeron members.

Referring again to the structures illustrated in the accompanying drawing, it may be seen that the boom 3 also preferably includes a pair of rail or track members 12 and 13 affixed to and along the length of the two longerons 4 which are interconnected with the turntable 7 by linear actuators 10 and 11 on the sides facing away from the other two longerons 4. The pair of rails or track-like members may be mounted on another different pair of said longeron members.

A dolly 14 or carriage-like device may move along substantially the entire length of the track members 12 and 13, in either direction and irrespective of the angle of the boom 3 relative to the turntable base 7, and by any of several convenient or conventional techniques. For example, the dolly 14 may be driven by actuating means contained within or interconnected with the dolly 14 itself, or it may be moved by a cable device attached to the boom 3, or other conventional means none of which are depicted in the illustration.

The dolly 14 is also preferably provided with a latch 15 of suitable design for releasably securing the dolly 14 to one or both of the track members 12 and 13 at any desired location therealong.

The linear actuators 10 and 11 may be extended to pivotally move the boom 3 to a positon which is substantially aligned with, or parallel to the surface of the turntable 7, whereby the SSEMPS assembly 2 may be conveniently stowed in the transporting vehicle (not depicted). It will be noted that the lattice-like structure of the boom 3 permits other objects to be placed in the spaces between its longerons 4 and the struts 5 and 6, while the SSEMPS assembly 2 is stowed in the orbital payload bay of the transport vehicle.

Alternatively, retraction of linear actuators 10 and 11 to their minimum limits will pivot the boom 3 to a position which is substantially perpendicular to the surface of the turntable 7, whereby the SSEMPS assembly may be used as an aid in berthing procedures as well as an aid in other operations within the contemplated purposes of the SSEMPS assembly.

The turntable base 7 may be mounted on one of the components of the space station sought to be assembled (not depicted), or it may be mounted on a portion of the transport vehicle (not depicted) in order to perform according to its requirements. Being erectable, the placement system, with its space framework boom 3, will remain rigid for providing a simple, stiff structure with which to maneuver payloads or to which objects may be secured.

It will be apparent, of course, that objects may be seized and moved to many locations adjacent the transport vehicle (not depicted) using the boom 3 which is revolvable by the turntable base 7 and pivotally movable by the linear actuators 10 and 11 as well as translation along the boom by the dolly 14. However, the capabilities of the SSEMPS assembly are greatly enhanced by providing the dolly 14 with a manipulating arm extension 16 such as the type of apparatus commonly known as the Shuttle Remote Manipulator System, which is preferably composed of an upper arm member 17 having an elbow-like connection 20 at one and, end which is pivotally secured to the dolly 14 at its other end by a shoulder-like connection 18. More particularly, the manipulating arm extension 16 may be seen to further include a so-called forearm member 19 interconnected pivotally at one end to the elbow-like connection 20, and which is interconnected at its other end to a wrist-like connection 22. In addition, a suitable gripping device 21 is preferably pivotally mounted on the wrist-like connection 22 opposite the adjacent end of the forearm member 19, for seizing and securing objects of various shapes and sizes as may be required for different purposes.

It will be apparent that the different components of the manipulating arm extension 16 may be repositioned either manually or by suitable driving means within its structures, and in conjunction with concurrent movement of the boom 3, the dolly 14, and the turntable base 7, it is capable of moving and relocating objects secured and held by the gripping member 21 in a manner outside the capabilities of the prior art devices and techniques.

Alternatively, the components of the manipulating arm extension 16 may be moved and repositioned mechanically by suitable driving and control means located within such components, and powered from within the dolly 14, according to concepts and designs already known in the prior art.

Linear actuators 10 and 11 and hinges 8 and 9, in combination with the rotatable turntable base 7 and linearly guided dolly 14, provide at least three additional degrees of freedom for placement of the manipulating arm 16.

Other modifications and variations will be suggested by a consideration of the components specifically described and referred to herein and depicted in the accompanying drawing. Their usefulness for different purposes will also be correspondingly apparent. Accordingly, the stuctures and techniques hereinbefore described and depicted are intended as illustrations only, and are not intended as limitations on the scope of the present invention.

What is claimed is:

1. A manipulator placement system for transfer and handling of work articles, comprising
    a rotatable turntable base member;
    an elongate support member pivotally attached at one end directly to said turntable base;
    a dolly member movable along said support member; and
    a manipulator arm attached to said dolly and composed of jointed segments for seizing and repositioning objects adjacent said placement system, wherein said elongate support member comprises
    a plurality of aligned and spaced-apart longeron members;
    a plurality of strut-like bracing members interconnecting said longeron members to form an elongated and lattice-like boom assembly for positioning said dolly member relative to said turntable base member;
    connecting means for allowing arcuate movement for pivotally interconnecting said boom assembly with said turntable base member, and wherein said connecting means includes at least one hinge-like member interconnecting said boom assembly with said turntable base member, and wherein said connecting means further includes at least one linear extending means interconnected between said turntable member and said boom assembly, and wherein still further, said linear extending means and said hinge-like members are interconnected between and with said turntable member and the proximal end of said elongate boom assembly.

2. The placement system described in claim 1, wherein said linear extending means are hingedly interconnected with and between said turntable member and the adjacent ends of a pair of longeron members.

3. The placement system described in claim 2, comprising a pair of track-like members aligned with and mounted on said elongate boom assembly for movably supporting said dolly member along the length of and between the proximal and distal ends of said elongated boom assembly.

4. The placement system described in claim 3, wherein said dolly member is movably positionable on and along said track members independently of revolvement of said elongate boom assembly by said rotatable turntable means.

5. The placement system described in claim 4, wherein said dolly member is movably positionable on and along said track members independently of pivotal movement of said elongate boom assembly by said linear extending means relative to said turntable member.

6. The placement system described in claim 5, wherein said dolly member further includes latch means for releasably interconnecting said dolly member fixedly with at least one of said track members.

7. The placement system described in claim 6, wherein said manipulator arm comprises
    a forearm-like member connectable with an object sought to be repositioned, and
    an upper-arm-like member pivotally interconnected at one end with said forearm-like member and at the other end with said dolly member for linear movement along said elongate boom assembly.

8. The placement system described in claim 7, wherein said manipulator arm further comprises an elbow-like connector for pivotally interconnecting said forearm-like member with said upper-arm-like member, and a shoulder-like connector for pivotally interconnecting said upper-arm-like member with said dolly member for lateral movement relative to said elongate boom assembly and independently of rotation of said turntable member.

9. The placement system described in claim 8, wherein said manipulator arm further comprises a wrist-like connector mounted on said forearm-like member opposite of said elbow-like connector, and a gripping member pivotally interconnected with said forearm-like member by said wrist-like connector.

10. The placement system described in claim 9, wherein said gripping member is further adapted and arranged to releasably interconnect with and reposition selected objects adjacent said elongate boom assembly.

11. The placement system described in claim 10, wherein said rotatable turntable permits a 360 degree rotation of said elongate support member in either direction.

* * * * *